(12) United States Patent
Bos (10) Patent No.: US 7,580,808 B2
(45) Date of Patent: Aug. 25, 2009

(54) ONBOARD TRIP COMPUTER FOR EMISSIONS SUBJECT TO REDUCTION CREDITS

(75) Inventor: Jeremy Bos, Coopersville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/853,672

(22) Filed: Sep. 11, 2007

(65) Prior Publication Data

US 2009/0069999 A1 Mar. 12, 2009

(51) Int. Cl.
*G06F 15/00* (2006.01)
*G01D 1/00* (2006.01)
*G06M 11/04* (2006.01)

(52) U.S. Cl. .................. 702/127; 702/81; 702/182; 702/188; 705/1; 705/7; 705/26; 701/35; 701/102; 73/23.31

(58) Field of Classification Search .................. 702/81, 702/127, 182, 183, 188; 705/7, 8, 10, 26; 502/42; 73/23.31
See application file for complete search history.

(56) References Cited

U.S. PATENT DOCUMENTS

| | | | |
|---|---|---|---|
| 5,343,906 A * | 9/1994 | Tibbals, III | 141/83 |
| 6,216,527 B1 * | 4/2001 | Beecham et al. | 73/23.31 |
| 7,343,341 B2 * | 3/2008 | Sandor et al. | 705/37 |
| 2007/0073459 A1 * | 3/2007 | Webster et al. | 701/29 |
| 2008/0015975 A1 * | 1/2008 | Ivchenko et al. | 705/37 |
| 2008/0154671 A1 * | 6/2008 | Delk | 705/7 |

* cited by examiner

*Primary Examiner*—Edward Raymond
*Assistant Examiner*—Elias Desta
(74) *Attorney, Agent, or Firm*—Ingrassia, Fisher & Lorenz, P.C.

(57) ABSTRACT

Methods and a system are provided for monitoring and processing the emissions footprint of one or more vehicles. An embodiment of an onboard vehicle method involves the collection of vehicle data from onboard data sources and the computation of an emissions value from the vehicle data. The emissions value indicates a total amount of a substance, such as carbon dioxide, released from the vehicle during a measurement period. The method also generates indicia of the emissions value with an onboard subsystem.

8 Claims, 4 Drawing Sheets

ONBOARD TRIP COMPUTER FOR EMISSIONS SUBJECT TO REDUCTION CREDITS

TECHNICAL FIELD

The subject matter described herein generally relates to onboard vehicle diagnostic and control systems. More particularly, the subject matter relates to an onboard system and associated operating methods for monitoring a carbon emissions footprint of a vehicle.

BACKGROUND

It is becoming increasingly popular to discuss and address issues such as caring for the environment, global warming, and pollution control. Concerns about global warming and greenhouse gases have led to efforts that encourage reduction of carbon emissions, allocate carbon emissions credits, monitor carbon emissions, and trade carbon emission credits in a manner akin to commodities or utilities (such as water and electrical power). Emission credits, such as verified emissions reduction (VER) credits, represent a quantity of a substance such as carbon dioxide ($CO_2$), methane ($CH_4$), nitrous oxide ($N_2O$), or other greenhouse gas that is commonly emitted by industrial plants, agricultural activities, aircraft, and vehicles. A number of organizations (such as the non-profit Carbonfund.org Foundation) enable consumers to offset their carbon emissions by purchasing or trading emission credits. For example, if a passenger on a commercial airline flight wishes to offset the amount of greenhouse gas emitted into the atmosphere as a result of her flight, she can purchase an equivalent amount of emission credits, where the money spent to purchase the emission credits is used to fund systems, processes, and programs that are intended to reduce the emission of greenhouse gases. In theory, the money spent to purchase the emission credits results in a reduction of emitted greenhouse gases that offsets the amount of greenhouse gases actually emitted by the aircraft (as prorated to account for the individual contribution of the purchaser). The website maintained by the Carbonfund.org Foundation provides additional information about carbon footprints, carbon offsets, and how people can help to reduce carbon-based emissions.

Some organizations provide a service that allows consumers to offset carbon emissions associated with vehicle usage. One such service is offered by AgCert International PLC through its Driving Green website (www.drivinggreen.com). This online service allows a user to estimate the annual amount of greenhouse gases emitted by a vehicle, based upon the following user-entered data: the vehicle manufacturer, the model, the model year, and the annual driving distance for a vehicle. The online service generates a rough estimate of the total weight of greenhouse gases produced by the designated vehicle during the course of one year, and gives the user the option to purchase emission credits to offset the estimated amount of greenhouse gases. This model relies on an honor system in that the user is free to enter any data for calculation of the estimated amount of greenhouse gases. In addition, this system does not facilitate real-time and accurate monitoring and tracking of the actual amount of carbon dioxide generated by a vehicle during operation.

BRIEF SUMMARY

A method for monitoring an emissions footprint of a vehicle is provided. The method involves collecting vehicle data from onboard data sources, computing an emissions value from the vehicle data, and generating indicia of the emissions value with an onboard subsystem. The emissions value indicates a total amount of a substance released from the vehicle during a measurement period.

A system for monitoring an emissions footprint of a vehicle is also provided. The system includes at least one data source configured to generate vehicle data associated with operation of the vehicle, a carbon calculator module coupled to the at least one data source, and a display element coupled to the carbon calculator module. The carbon calculator module is configured to compute an emissions value from the vehicle data, where the emissions value indicates a total amount of a substance released from the vehicle during a measurement period. The display element is configured to generate a display of the emissions value.

An alternate method for monitoring an emissions footprint of a vehicle is also provided. This method involves dynamically computing an emissions value from vehicle data collected in real-time by onboard data sources, the emissions value indicating a total amount of a substance released from the vehicle during a measurement period, and initiating a purchase transaction for emission reduction credits to offset at least a portion of the emissions value.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

DESCRIPTION OF THE DRAWINGS

At least one embodiment of the present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments may be practiced in conjunction with any number of data transmission protocols and vehicle configurations, and that the system described herein is merely one suitable example.

For the sake of brevity, conventional techniques related to vehicle data processing, data transmission, network control, vehicle telematics systems and services, carbon offsetting systems and services, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the subject matter.

Figure 4:
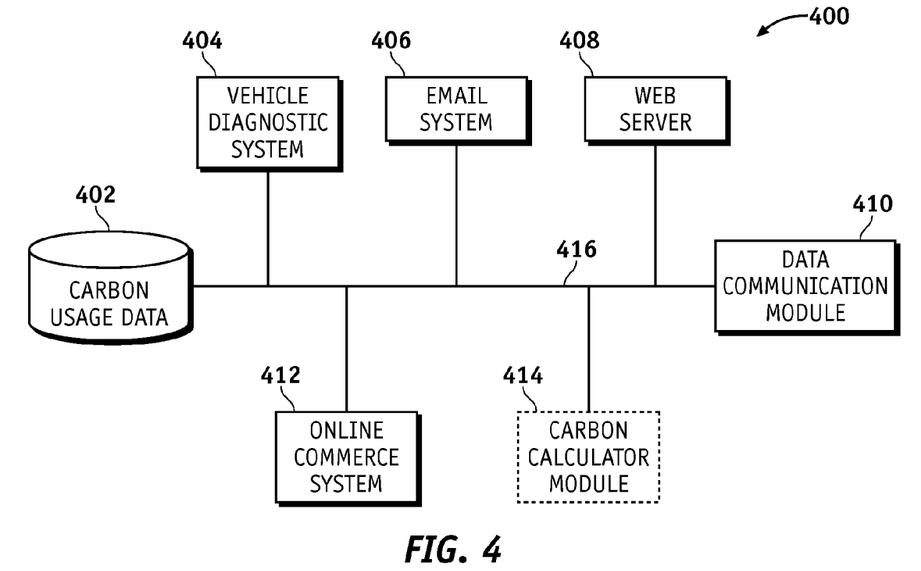
FIG. 4 is a schematic representation of an embodiment of a remote command center suitable for use with a system for monitoring an emissions footprint of a vehicle.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematics shown in FIGS. 1, 2, and 4 depict exemplary arrangements of elements, additional intervening elements, devices, features, or components may be present in an embodiment of the depicted subject matter.

The techniques and technologies described herein leverage vehicle data that is generated by an onboard vehicle system. This vehicle data, which is typically available on the serial data buses and/or the onboard computing network of the vehicle, is utilized to calculate the actual carbon emissions footprint of the vehicle during operation. A carbon emissions total, a value, or any suitable indicator can be displayed to the driver in any suitable manner. For example, a dashboard display element of the vehicle can be configured to display a carbon emissions value in the form of a running total (similar to a trip computer). In addition, the onboard system may be suitably configured to allow the operator to purchase offsetting carbon emission credits through an appropriate source or service. Moreover, carbon usage data can be incorporated into a remote vehicle diagnostic system that is maintained by a remote command center for the vehicle. The remote command center could be used to automatically bill vehicle operators to offset their carbon emissions, and/or used to present vehicle operators with different options that facilitate purchasing of offsetting emission credits. In some deployments of the system described herein, an automotive manufacturer can be a broker of carbon credits, buying credits in bulk and reselling them to vehicle operators.

In one deployment, an onboard system uses existing production components and available vehicle data to calculate the amount of carbon dioxide emitted from the vehicle (in units of weight or mass). This carbon emissions value may be accumulated and displayed in a manner equivalent to an odometer. The operator can then choose to offset the carbon emissions value through a portal of choice or via a purchase transaction facilitated by a remote command center with which the vehicle communicates. A vehicle manufacturer could bundle credit purchases together and buy credits at a discount rate acting as a broker for the individual operators. Alternatively, the onboard system itself could support direct purchasing of offsetting credits from the vehicle. Similarly, emission credits could be purchased elsewhere (e.g., on a card or from an online service) and used to reset the onboard carbon emissions value. For subscribers to a telematics service (such as the ONSTAR® service), the carbon emissions data could be uploaded in connection with routine vehicle diagnostics functions.

Figure 1:
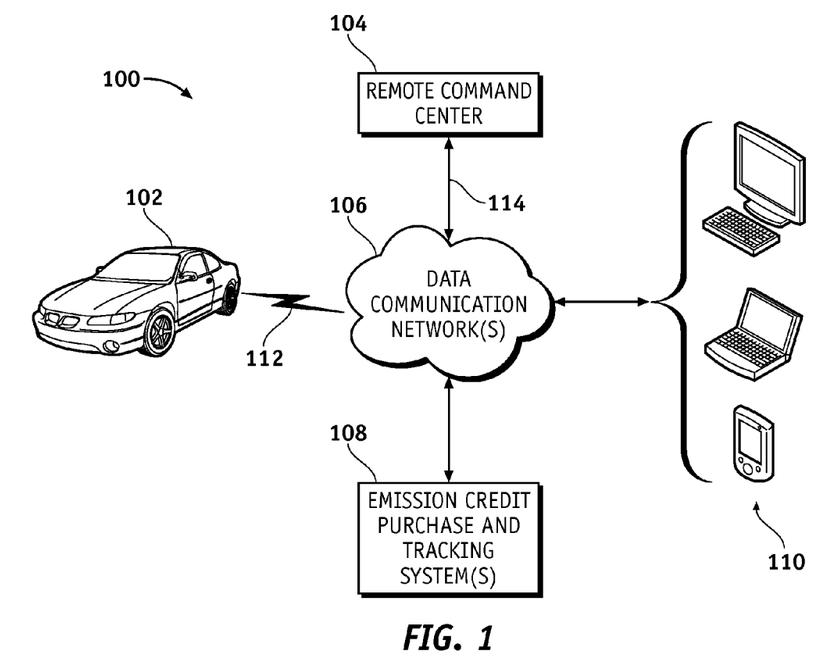
FIG. 1 is a schematic representation of an operating environment for an embodiment of a system for monitoring an emissions footprint of a vehicle.
Figure 2:
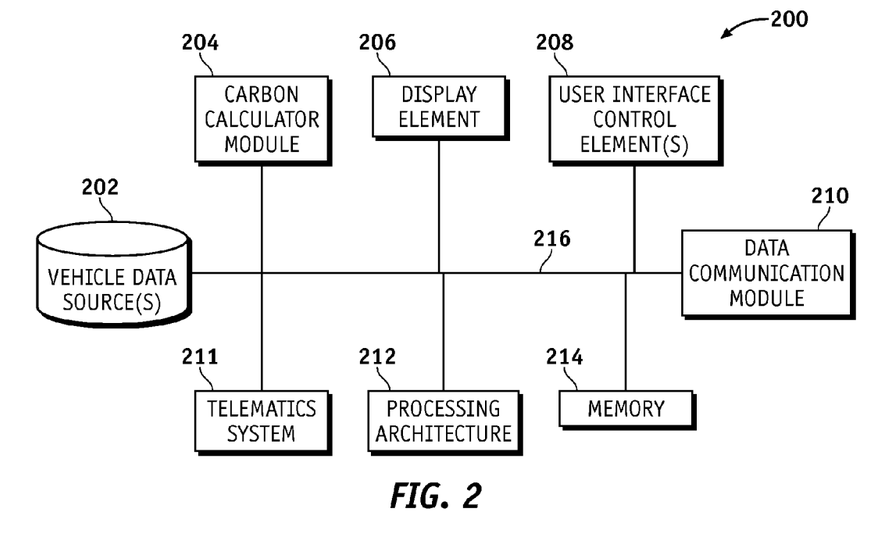
FIG. 2 is a schematic representation of an embodiment of an onboard system for monitoring an emissions footprint of a vehicle.

FIG. 1 is a schematic representation of an operating environment for an embodiment of a system 100 for monitoring an emissions footprint of a vehicle. System 100 is suitably configured to support any number of vehicles, such as vehicle 102 (subject to any practical operating limitations on data communication bandwidth, processing power, memory capacity, and the like). For simplicity, only one vehicle 102 is depicted in FIG. 1. In certain embodiments, vehicle 102 includes an onboard telematics system module and a data communication module that are configured to communicate with remote command center 104 using one or more data communication networks 106. Remote command center 104 may be maintained by a telematics system provider and/or another entity such as a vehicle manufacturer, a utility company, or the like. The data communication between vehicle 102 and its host remote command center 104, and between remote command center 104 and other components in system 100, may be performed in accordance with one or more wireless data communication protocols, such as, without limitation: cellular; satellite; BLUETOOTH® wireless data communication; or IEEE 802.11 (any applicable variant).

System 100 may be suitably configured to leverage a vehicle telematics system such as the ONSTAR® communication system. As used herein, a vehicle telematics system is a system that connects a vehicle with a communication system, network, or architecture (such as a cellular telephone network or system). Telematics systems support data communication (usually wireless) between one or more onboard vehicle systems and a remote command center, entity, network, or computing architecture. Telematics systems typically support bidirectional data transfer such that the remote command center can provide services to the user of the vehicle, upgrade software-based vehicle components, receive diagnostic vehicle data for storage and/or processing, receive emergency calls from a user of the vehicle, etc. Telematics systems are capable of tracking the current locations of compatible vehicles using satellite-based global positioning system (GPS) technology. Telematics systems are well known to those familiar with the automotive industry, and as such they will not be described in detail here.

In FIG. 1, data communication network(s) 106 generally represents the systems, infrastructure, processing capabilities, data transmission lines, wireless data communication channels, and architecture that supports the processing, routing, transmission, and/or transport of data between remote command center 104 and vehicle 102. Data communication network(s) 106 may be compatible with any number of known network types, techniques, technologies, and protocols (wired or wireless). Wireless data communication protocols, techniques, or methodologies supported by data communication network(s) 106, include, without limitation: RF; IrDA (infrared); BLUETOOTH®; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB. Wired data communication protocols, techniques, or methodologies supported by data communication network(s) 106 include, without limitation: Ethernet; home network communication protocols; USB; IEEE 1394 (Firewire); hospital network communication protocols; and proprietary data communication protocols.

System 100 may also include one or more emission credit purchase and tracking systems 108. In the context of system 100, an emission credit purchase and tracking system 108 is a system that allows users to purchase, apply, trade, exchange, monitor, track, estimate, or otherwise process: emission reduction credits; VER credits; carbon offsetting units; mobile emission reduction credits (MERCs); certified emission reduction (CER) credits; Clean Development Mechanism (CDM) funding; or the like. In this regard, an emission credit purchase and tracking system 108 may be implemented with a website, deployed in connection with a trading exchange for greenhouse gas credits, deployed in connection with a telematics system provider, deployed in connection with a utility company, or the like. As described in more detail herein, an onboard system of vehicle 102 can communicate with emission credit purchase and tracking systems 108 (using data communication network(s) 106) directly or via remote command center 104.

System 100 may also include or communicate with computing devices 110 owned or accessed by the vehicle operators. A computing device 110 may be any suitably configured device, system, or architecture, including, without limitation: a desktop computer; a laptop computer; a mobile computing device such as a personal digital assistant; a mobile telecommunication device such as a smart phone; or a web enabled cellular telephone. In this embodiment, computing devices 110 are suitably configured to communicate with remote command center 104, emission credit purchase and tracking system(s) 108, and/or vehicle 102 as needed, either directly or via data communication network(s) 106.

The various components of system 100 can communicate with each other using wired and/or wireless data communication techniques, technologies, and protocols. In FIG. 1, the communication link 112 represents the typical scenario where a wireless link is utilized for data communication with an onboard telematics system of vehicle 102 (alternatively or additionally, vehicle 102 may employ a wired link such as an interconnect cable). The link 114 represents one or more wireless and/or wired data communication links between remote command center 104 and data communication network(s) 106, the link 116 represents one or more wireless and/or wired data communication links between emission credit purchase and tracking system(s) 108 and data communication network(s) 106, and the link 118 represents one or more wireless and/or wired data communication links between computing devices 110 and data communication network(s) 106.

FIG. 2 is a schematic representation of an embodiment of an onboard system 200 for monitoring an emissions footprint of a vehicle. System 200 is onboard in the sense that all of its components are integrated in, carried by, or attached to a host vehicle, such as vehicle 102 (FIG. 1). The illustrated embodiment of system 200 includes, without limitation: at least one data source 202 that is configured to generate vehicle data associated with the operation of the host vehicle; a carbon calculator module 204; a display element 206; user interface control element(s) 208; a data communication module 210; a telematics system 211; a processing architecture 212; and a suitable amount of memory 214. These elements, along with other electronic devices, electronic control modules, and processing components of the host vehicle, may be coupled together using a data communication bus, a network arrangement, conductive elements, and/or any suitably configured interconnection architecture 216.

Processing architecture 212 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. A processor may be realized as a microprocessor, a controller, a microcontroller, or a state machine. Moreover, a processor may be implemented as a combination of computing devices, e.g., a combination of a digital signal processor and a microprocessor, a plurality of microprocessors, one or more microprocessors in conjunction with a digital signal processor core, or any other such configuration.

Memory 214 may be realized as RAM memory, flash memory, EPROM memory, EEPROM memory, registers, a hard disk, a removable disk, a CD-ROM, or any other form of storage medium known in the art. In this regard, memory 214 can be coupled to processing architecture 212 such that processing architecture 212 can read information from, and write information to, memory 214. In the alternative, memory 214 may be integral to processing architecture 212. As an example, processing architecture 212 and memory 214 may reside in an ASIC.

Processing architecture 212 is suitably configured to perform or facilitate the various functions and operations described herein. In this regard, other functional modules of system 200 (or portions thereof) may be executed by or realized in processing architecture 212. For example, carbon calculator module 204, data communication module 210, and/or telematics system 211 may be implemented (in whole or in part) by processing architecture 212. FIG. 2 depicts separate modules for ease of illustration and description.

A control or processing module in system 200 (including carbon calculator module 204, data communication module 210, telematics system 211, and processing architecture 212) may comprise any type of processing element or vehicle controller known in the art, and it can be equipped with nonvolatile memory, random access memory (RAM), discrete and analog input/output (I/O), a central processing unit, and/or communications interfaces for networking within an automotive communications network. Moreover, the steps of a method or algorithm described in connection with the embodiments disclosed herein may be embodied directly in hardware, in firmware, in a software module executed by a processor, or in any practical combination thereof.

The subject matter and certain aspects of the embodiments thereof may be described in the general context of computer-executable instructions, such as program modules, executed by one or more computing modules, controllers, or other devices. Generally, program modules include routines, programs, objects, components, data structures, and/or other elements that perform particular tasks or implement particular abstract data types. Typically, the functionality of the program modules may be combined or distributed as desired in various embodiments. A computing device that performs computer-executable instructions typically includes at least some form of computer readable media. Computer readable media can be any available media that can be accessed by a computing device and/or by applications executed by a computing device.

Referring again to FIG. 2, a data source 202 may be realized as a sensor, a transducer, a memory element, a detector, a signal processor, or any component that employs hardware, software, and/or firmware to generate vehicle data that identifies a characteristic, parameter, quantity, status, state, or condition of the vehicle, the operating environment of the vehicle, the fuel or other consumables used by the vehicle, etc. In certain embodiments, system 200 utilizes existing and known sensors and components for data sources 202. Indeed, system 200 is suitably configured to access vehicle data that is already available (for other purposes) on the onboard data communication and computing network of the host vehicle. In practice, data sources 202 may generate one or more of the following vehicle data types, without limitation: fuel economy data, intake airflow data, exhaust flow data, engine temperature data, fuel type data, fuel octane data, vehicle velocity data, vehicle acceleration data, vehicle make/model/year data, mileage data, fuel injector pulse width data, exhaust gas temperature data, exhaust gas oxygen data.

Carbon calculator module 204 is configured to compute an emissions value from relevant vehicle data provided by data source(s) 202, where the emissions value indicates a total amount of a substance released from the host vehicle during a given measurement period. For this example, the monitored substance is a carbon-containing substance such as carbon dioxide ($CO_2$) or methane ($CH_4$). Alternatively, the monitored substance may be nitrous oxide ($N_2O$) or any greenhouse gas. Carbon calculator module 204 may utilize one or more algorithms that receive vehicle data from data source(s) 202, process the vehicle data, and compute the emissions value as needed. The emissions value can be any indicator, quantity, or measurement that represents the amount of the monitored substance that has been emitted from the host vehicle since the beginning of the present measurement period. In certain embodiments, the emissions value indicates an accumulated weight or mass of the monitored substance. For example, the emissions value may indicate the weight of $CO_2$ released from the host vehicle during the measurement period.

Figure 3:
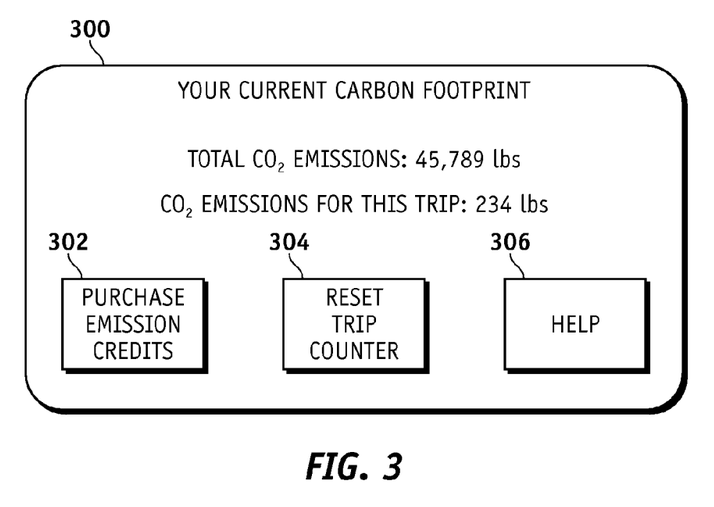
FIG. 3 is an exemplary screen shot of an onboard display element of a vehicle.

Display element 206 is suitably configured to generate visual indicia of the calculated emissions value. In this regard, FIG. 3 is an exemplary screen shot 300, which may be rendered by display element 206. For this embodiment, display element 206 generates a display of the emissions value, and this display is updated in substantially real time during operation of the host vehicle. In a typical deployment of system 200, display element 206 represents a primary onboard display of the host vehicle, e.g., a dashboard mounted screen. Display element 206 is suitably configured to enable system 200 to render and display information (such as the emissions value) related to the monitoring, tracking, and crediting of vehicle emissions. Notably, the specific configuration, operating characteristics, size, resolution, and functionality of display element 206 can vary depending upon the practical implementation of system 200 and the host vehicle. For example, display element 206 may be implemented using a liquid crystal display (LCD), a plasma monitor, a stylus writing screen, a touchpad, or the like.

Screen shot 300, which represents only one of many possible display configurations, includes a display of the $CO_2$ emissions (234 pounds) for the current measurement period or trip. Screen shot 300 also includes a display of the total $CO_2$ emissions (45,789 pounds) generated during the operating life of the vehicle. Thus, emissions values can be displayed in a manner akin to a traditional vehicle odometer where the total lifetime value cannot be reset by the operator.

In addition to (or in lieu of) display element 206, system 200 may include one or more speakers or transducers, which can be used to generate audible messages (or other audible indicia) that convey the monitored emissions value. In this context, an audible message can be an audible alarm, a reminder tone, a voice message, a media clip, or the like.

User interface control element(s) 208 are configured to process and react to user-initiated requests, commands, or instructions. A control element 208 can be realized as any hardware, software, and/or firmware component that is designed to respond to a user input or command. A user command may correspond to the manual actuation of a button or switch, a voice command, or any other human action intended to achieve a desired result. Referring again to FIG. 3, screen shot 300 includes three graphically displayed control elements. These graphically displayed control elements can be activated by touch (if screen shot 300 is rendered on a touch screen), or by manipulation of a graphical pointing or selection feature. A first control element 302 can be activated to purchase emission credits, a second control element 304 can be activated to reset the emissions trip counter, i.e., to start a new measurement period for the emitted substance, and a third control element 306 can be activated to launch a help feature. Of course, a practical onboard system can be suitably configured to provide additional or alternative control elements as needed to support the desired functionality.

An embodiment of system 200 may employ any number of wireless and/or wired data communication modules 210. These data communication modules are suitably configured to support wireless/wired data communication (unidirectional or bidirectional, depending upon the particular implementation) between the host vehicle and external destination devices or systems. A data communication module 210 is configured to support one or more wireless and/or one or more wired data communication protocols, including any of the protocols mentioned above in the context of data communication network(s) 106 (FIG. 1).

Telematics system 211 is suitably configured to facilitate data communication with a host remote command center (e.g., remote command center 104 depicted in FIG. 1). Telematics system 211 can communicate with the remote command center using a wireless data communication link and/or a wired link. In this embodiment, telematics system 211 cooperates with data communication module 210 to transmit data indicative of the calculated emissions values to the remote command center. In addition, telematics system 211 may cooperate with data communication module 210 to transmit purchase commands to the remote command center, where such purchase commands initiate the processing of a purchase transaction for emission reduction credits.

FIG. 4 is a schematic representation of an embodiment of a remote command center 400 suitable for use with a system for monitoring an emissions footprint of a vehicle. Remote command center 104 in FIG. 1 may be implemented in this manner. The illustrated embodiment of remote command center 400 generally includes, without limitation: a usage database 402; a vehicle diagnostic system 404; an email system 406; a web server 408; at least one data communication module 410; an online commerce system 412; and an optional carbon calculator module 414. These elements, along with other subsystems, devices, electronic control modules, and processing components, may be coupled together using a data communication bus, a network arrangement, conductive elements, and/or any suitably configured interconnection architecture 416.

Usage database 402 is maintained for the subscribers associated with remote command center 400. In other words, usage database 402 may contain individual records for a plurality of vehicle operators. For each user, usage database 402 stores data associated with the monitored emissions for that user. For example, usage database 402 may store data indicative of: the accumulated lifetime emissions value (e.g., total pounds of $CO_2$) for each monitored vehicle; the accumulated emissions values on a trip-by-trip basis; and/or purchase records for emission reduction credits. For this particular embodiment, usage database 402 receives updated emissions values from the subscriber vehicles, via the vehicle diagnostic system 404. In this context, vehicle diagnostic system 404 is configured to receive vehicle diagnostic data from the subscriber vehicles, where such vehicle diagnostic data includes the current emissions values generated by the onboard carbon calculator modules.

Although not a requirement, vehicle diagnostic system 404 typically receives the vehicle diagnostic data by communicating with the onboard telematics system (see FIG. 2). In alternate embodiments, remote command center 400 includes its own carbon calculator module 414, which receives vehicle data from the host vehicles and computes the respective emissions values in the manner described above for carbon calculator module 204 (FIG. 2). In such alternate embodiments, remote command center 400 receives the relevant vehicle data from the onboard data source(s) 202.

An embodiment of remote command center 400 may employ any number of wireless and/or wired data communication modules 410. These data communication modules are suitably configured to support wireless/wired data communication (unidirectional or bidirectional, depending upon the particular implementation) between remote command center 400 and other components, devices, or elements in the system. For example, data communication module(s) 410 can facilitate communication with the subscriber vehicles, a purchase system for emission reduction credits, end user computing devices, or the like. A data communication module 410 is configured to support one or more wireless and/or one or more wired data communication protocols, including any of the protocols mentioned above in the context of data communication network(s) 106 (FIG. 1).

As described in more detail herein, remote command center 400 may be capable of facilitating purchase transactions for emission reduction credits. In certain embodiments, remote command center 400 itself includes online commerce system 412 to perform purchase transactions on behalf of its subscribers. Online commerce system 412 can leverage well known techniques, technologies, and protocols to receive, process, and execute purchase transactions for emission reduction credits, where such purchase transactions may originate at subscriber vehicles or at computing devices owned or operated by subscribers.

Remote command center 400 may be alternatively or additionally configured to process requests to purchase emission reduction credits in an indirect manner. For example, remote command center 400 may process a purchase transaction request by sending an electronic message (e.g., an email, a text message, or an instant message) to the operator of the respective vehicle. Email system 406 can be utilized for this function. The electronic message may serve as a reminder that asks the operator to independently complete the purchase. Alternatively, the electronic message may enable the operator to complete the purchase transaction. In this regard, the electronic message may contain an active link, hypertext, or some type of active control element that directs the user to an appropriate online commerce site or webpage. As another example, remote command center 400 may process a purchase transaction request by sending a markup language document (e.g., a webpage) to the operator of the respective vehicle. Web server 408 can be utilized for this function. The markup language document can be rendered at any computing device to which the operator has access, or it can be rendered on the onboard display element. In practice, the markup language document may be associated with an appropriate online commerce site or webpage that enables the operator to complete the purchase transaction.

Remote command center 400 may also be capable of automatically billing its subscribers for their vehicle related carbon usage. For example, one possible scenario involves the annual allocation of a specified amount of $CO_2$ emissions per person. If remote command center 400 determines that a person has exceeded his allocation, then remote command center 400 could automatically generate an invoice (electronic or paper) for that person, where the invoice represents payment for the excess $CO_2$ generated by the person's vehicle.

Figure 5:
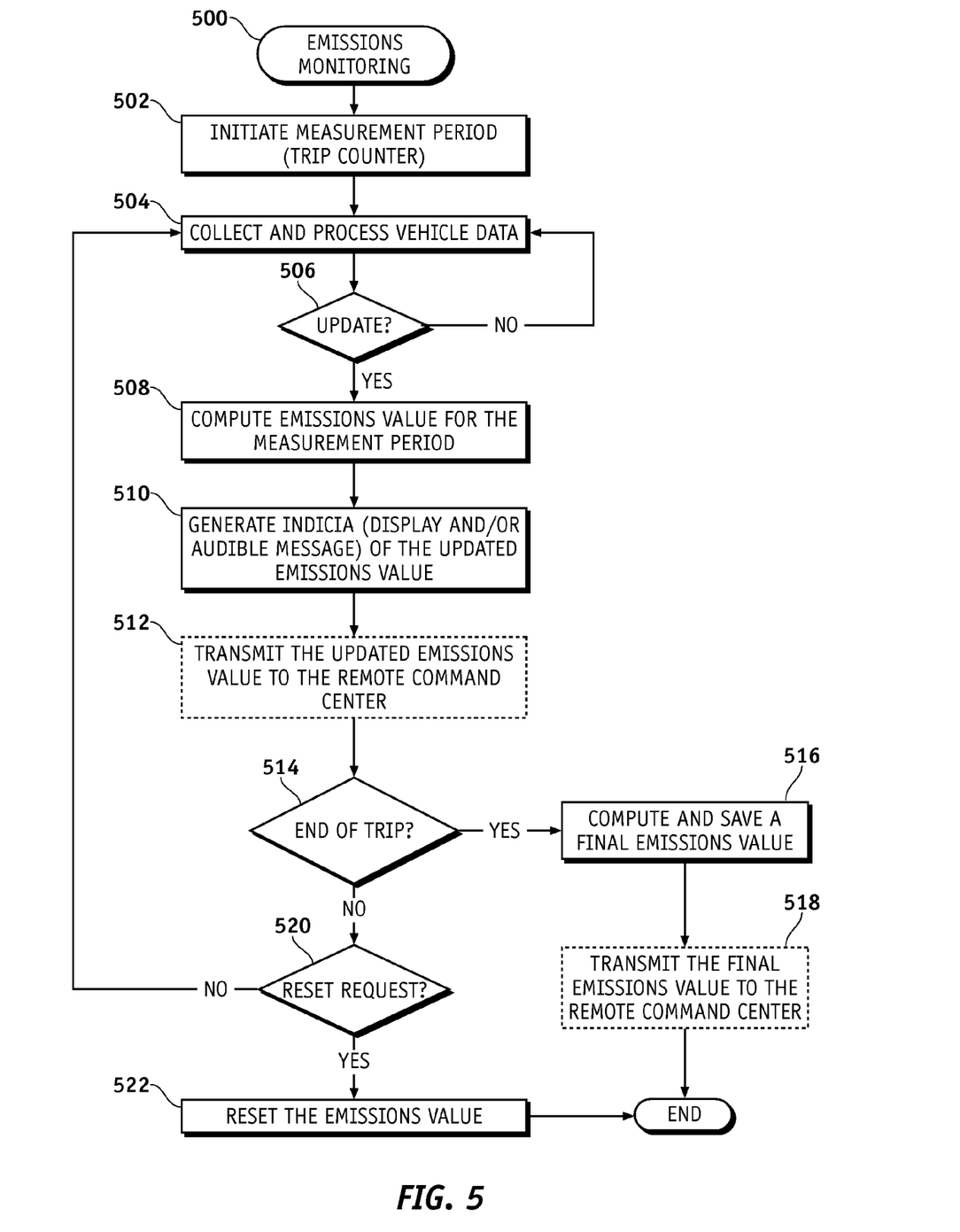
FIG. 5 is a flow chart that illustrates an embodiment of an emissions monitoring process.

Referring again to FIG. 1, system 100 can support the monitoring of an emissions footprint of a vehicle, and the purchasing of emission reduction credits associated with the operation of the vehicle. In this regard, FIG. 5 is a flow chart that illustrates an embodiment of an emissions monitoring process 500 that might be performed by system 100. The various tasks performed in connection with process 500 may be performed by software, hardware, firmware, or any combination thereof. For illustrative purposes, the following description of process 500 may refer to elements mentioned above in connection with FIGS. 1-4. In practice, portions of process 500 may be performed by different elements of the described system, e.g., a carbon calculator module, a display element, or a processor. It should be appreciated that process 500 may include any number of additional or alternative tasks, the tasks shown in FIG. 5 need not be performed in the illustrated order, and process 500 may be incorporated into a more comprehensive procedure or process having additional functionality not described in detail herein.

Emissions monitoring process 500 may being by initiating a new measurement period (task 502). Task 502 may represent the resetting of a trip counter for the emissions monitoring system. In connection with task 502, the emissions value of interest will also be initialized, preferably to a value of zero. After initialization, process 500 collects and processes vehicle data provided by one or more onboard data sources (task 504). The data may be sampled at any desired sampling rate, or on demand under the control of the governing processing module.

The onboard system may be configured to update the monitored emissions value (e.g., pounds of $CO_2$) at any desired frequency. If emissions monitoring process 500 determines that an update is due (query task 506), then a current emissions value for the measurement period is computed (task 508). If an update is not due, then process 500 can be re-entered at task 504 to continue collecting and processing the vehicle data in real time (or substantially real time). The current emissions value is computed from the collected vehicle data, and the current emissions value indicates the total amount of the monitored substance that has been released from the vehicle during the measurement period. This particular embodiment dynamically computes the weight of $CO_2$ released from the vehicle during the measurement period, based upon the real time vehicle data.

The vehicle data used to calculate the emissions value, and the particular relationships and algorithms used to process the vehicle data, may vary from one embodiment to another, depending upon the desired accuracy, the available vehicle data, and/or other factors. For example, one straightforward calculation is based upon the fuel economy data (e.g., miles per gallon) of the vehicle: $CO_2(lbs)=f(MPG)$, where $f()$ represents an appropriate function that processes the miles per gallon as an input. Alternatively, the calculation of the current emissions value may be based upon other vehicle data that influences the rate at which the monitored substance is emitted by the vehicle. For instance, the current emissions value may be influenced by one or more of the following, without limitation: amount of oxygen consumed, which may be derived from the air intake rate and/or the exhaust rate; engine oil temperature; outside air temperature; octane rating of the fuel; the type of fuel, e.g., diesel, unleaded, or ethanol; vehicle speed; engine RPM; and driving patterns, e.g., freeway usage versus stop-and-go driving. In contrast to the rough estimation techniques utilized by carbon counting websites, emissions monitoring process 500 accurately calculates the current emissions value based upon real time collected vehicle data to provide a better calibrated and quantitative assessment of the actual amount of the substance being emitted by the vehicle.

After the current emissions value has been determined, an onboard vehicle subsystem generates appropriate indicia of the updated emissions value (task 510). During task 510 the onboard subsystem may generate a display of the current emissions value. Alternatively or additionally, the onboard subsystem may generate an audible message that conveys the emissions value. In preferred embodiments, the current emissions value is displayed for easy viewing by the driver of the vehicle. Depending upon the system implementation, emissions monitoring process 500 may transmit data indicative of the current emissions value to the remote command center that supports the vehicle (task 512). Task 512 is depicted as a dashed box to indicate its optional nature. The manner in which the remote command center processes received emissions values is discussed below with reference to FIG. 6.

For this embodiment, emissions monitoring process 500 continues to update the calculated emissions value during the measurement period. A query task 514 may be performed to determine whether the monitored trip has ended. At the end of the trip, i.e., when the measurement period has ended, process 500 can compute and save a final emissions value for that measurement period (task 516). Depending upon the system implementation, process 500 may transmit the final emissions value to the remote command center for appropriate handling (task 518). Task 518 is depicted as a dashed box to indicate its optional nature.

If the trip has not yet ended, then emissions monitoring process 500 determines whether the onboard system has received a request to reset the emissions value (query task 520). This reset request may be a user-initiated request, a request generated internally by the onboard system, or a request generated by the remote command center. If query task 520 detects a received reset request, then process 500 resets the current emissions value (task 522). In practice, task 522 may reinitialize the emissions value to an appropriate value such as zero. If query task 520 does not detect a received reset request, then process 500 may be re-entered at task 504 to continue collecting and processing the real time vehicle data.

Figure 6:
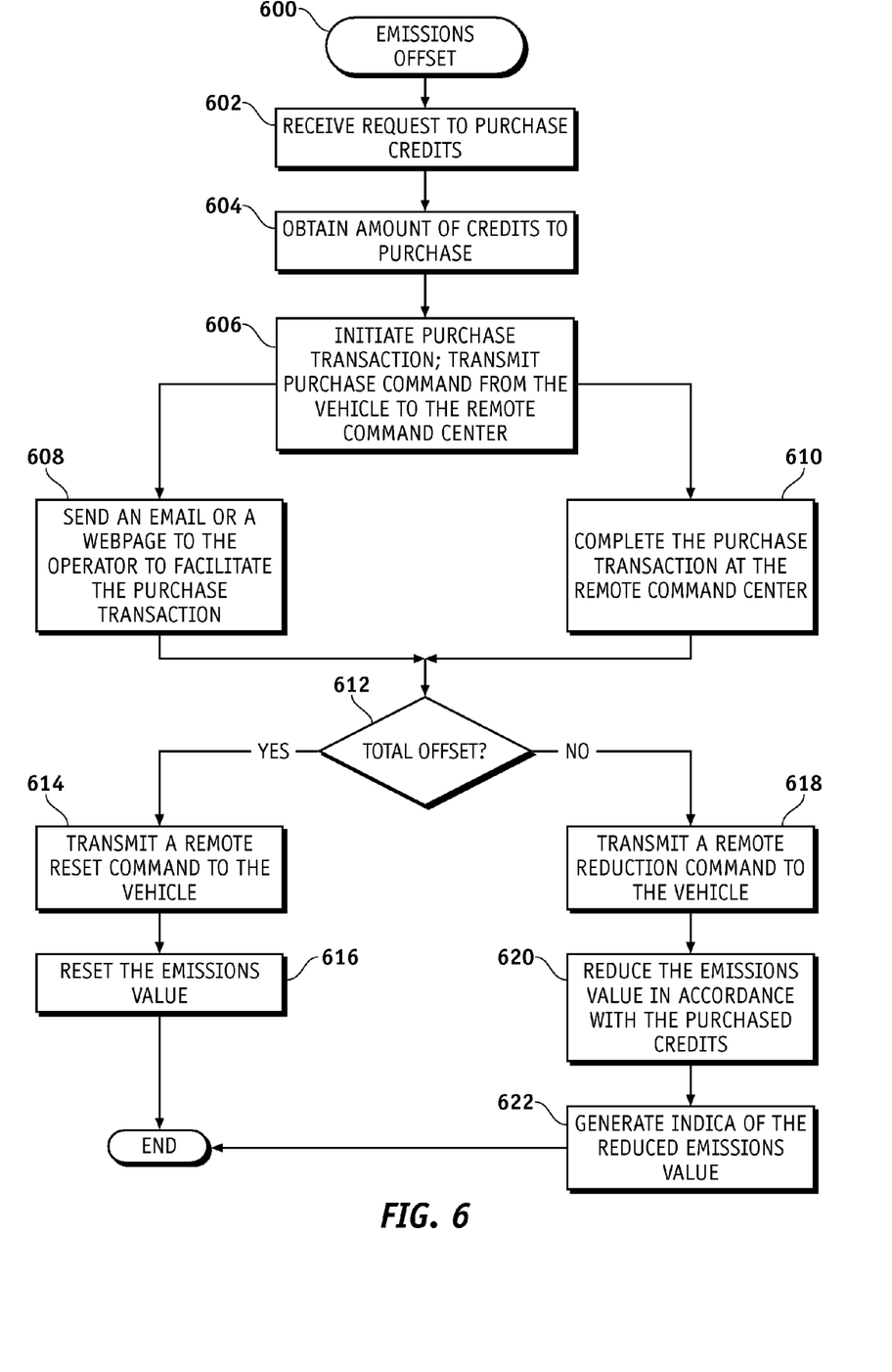
FIG. 6 is a flow chart that illustrates an embodiment of an emissions offset process.

As mentioned above, the onboard system is preferably configured to facilitate the purchasing/ordering of emission reduction credits, e.g., VER credits, carbon offsetting units, MERCs, CER credits, or the like. FIG. 6 is a flow chart that illustrates an embodiment of an emissions offset process 600 that might be performed by system 100. The various tasks performed in connection with process 600 may be performed by software, hardware, firmware, or any combination thereof. For illustrative purposes, the following description of process 600 may refer to elements mentioned above in connection with FIGS. 1-4. In practice, portions of process 600 may be performed by different elements of the described system, e.g., a component of the onboard vehicle system or a component of the remote command center. It should be appreciated that process 600 may include any number of additional or alternative tasks, the tasks shown in FIG. 6 need not be performed in the illustrated order, and process 600 may be incorporated into a more comprehensive procedure or process having additional functionality not described in detail herein. In practice, process 600 may be executed concurrently with emissions monitoring process 500.

Emissions offset process 600 may begin when the onboard system receives a request to purchase emission reduction credits (task 602). This request may be a user-initiated request, a request generated internally by the onboard system, or a request generated by a remote device or system. For purposes of this example, this request is a user-initiated request that is generated in response to user manipulation of an onboard user interface, such as control element 302 (see FIG. 3). The user may choose to purchase emission reduction credits to offset at least a portion of an emissions value displayed to the user. Thus, process 600 may need to obtain the amount of emission reduction credits to purchase (task 604). The amount of credits may be automatically obtained by the onboard system if the only option is to fully offset the displayed emissions value. Alternatively, the onboard system may be suitably configured to allow the user to enter a desired amount for purchase.

The embodiment described here responds to the purchase request by initiating a purchase transaction for the emission reduction credits (task 606). Task 606 represents any triggering event that occurs at the onboard system. For example, the onboard vehicle system may transmit a suitably formatted purchase command from the vehicle to the appropriate remote command center for processing and handling of the purchase transaction. The remote command center can process the purchase command in different ways, depending upon the particular system deployment. For example, emissions offset process 600 may respond to the received purchase command by sending (task 608) an electronic message to an operator of the respective vehicle, where the electronic message enables that operator to complete the purchase transaction in an independent manner. As mentioned previously, the electronic message may be an email, a text message, a media file, or a pager message. As another example, process 600 may respond to the received purchase command by sending (task 608) a webpage to an operator of the respective vehicle, where the webpage enables the operator to complete an online purchase of the emission reduction credits. As yet another example, process 600 may respond to the received purchase command by completing the purchase transaction itself (task 610). To support this option, the remote command center will include or communicate with an appropriate commerce system/application that handles emission reduction credit transactions.

If completion of the purchase transaction represents a total offset of the current emissions value (query task 612), then the remote command center transmits a remote reset command to the vehicle upon completion of the purchase transaction (task 614). In response to the received reset command, the onboard system resets the current emissions value to an appropriate value (such as zero), and emissions offset process 600 ends. If, however, only a partial offset has occurred, then the remote command center transmits a remote reduction command to the vehicle upon completion of the purchase transaction (task 618). In response to the received reduction command, the onboard system reduces the current emissions value in accordance with the purchased credits (task 620). In this regard, the emissions value maintained by the onboard system is reduced by an amount that is influenced by the purchased emission reduction credits, resulting in an updated emissions value. The onboard system may also generate indicia (e.g., a display) of the updated emissions value to reflect the impact of the purchase (task 622). Process 600 ends after completion of task 622.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An onboard system for monitoring an emissions footprint of a vehicle, the system comprising:
   at least one onboard data source configured to generate vehicle data associated with operation of the vehicle;
   an onboard carbon calculator module coupled to the at least one data source, the carbon calculator module being configured to compute an emissions value from the vehicle data, the emissions value indicating a total amount of a carbon-containing substance released from the vehicle during a measurement period;
   an onboard display element coupled to the carbon calculator module, the display element being configured to generate a display of the emissions value, and configured to generate a user interface control element for activating a user-initiated request to purchase emission reduction credits to offset at least a portion of the emissions value; and
   an onboard data communication module coupled to the user interface control element, the data communication module being configured to transmit, in response to the user-initiated request, a purchase command to a remote command center for processing of a purchase transaction for the emission reduction credits.

2. The system of claim 1, further comprising a data communication module coupled to the carbon calculator module, the data communication module being configured to transmit data indicative of the emissions value to a remote command center.

3. The system of claim 1, wherein the at least one data source is configured to generate vehicle data selected from the group consisting of fuel economy data, intake airflow data, exhaust flow data, engine temperature data, fuel type data, fuel octane data, vehicle velocity data, vehicle acceleration data, vehicle make/model/year data, mileage data, fuel injector pulse width data, exhaust gas temperature data, and exhaust gas oxygen data.

4. A method for monitoring an emissions footprint of a vehicle, the method comprising:
   dynamically computing an emissions value from vehicle data collected in real-time by onboard data sources, the emissions value indicating a total amount of a substance released from the vehicle during a measurement period;
   initiating, with an onboard system of the vehicle, a purchase transaction for emission reduction credits to offset at least a portion of the emissions value;
   transmitting a purchase command from the vehicle to a remote command center, the purchase command corresponding to the purchase transaction;
   completing the purchase transaction at the remote command center upon receipt of the purchase command;
   in response to completing the purchase transaction, transmitting a remote reduction command from the remote command center to the vehicle; and
   upon receipt of the remote reduction command at the vehicle, reducing the emissions value in accordance with the purchased emission reduction credits.

5. The method of claim 4, farther comprising receiving a user-initiated request to purchase the emission reduction credits, wherein initiating a purchase transaction is performed in response to the user-initiated request.

6. The method of claim 4, further comprising:
   the remote command center transmitting a remote reset command to the vehicle upon completion of the purchase transaction; and
   resetting, in response to the remote reset command, the emissions value.

7. The method of claim 6, wherein:
   the method further comprises the remote command center receiving the purchase command and, in response thereto, sending an electronic message to an operator of the vehicle, the electronic message enabling the operator to complete the purchase transaction.

8. The method of claim 6, wherein:
   the method further comprises the remote command center receiving the purchase command and, in response thereto, sending a markup language document to an operator of the vehicle, the markup language document enabling the operator to complete the purchase transaction online.

* * * * *